March 25, 1969      D. BOGUE      3,434,676
FISHING REEL BRAKE
Filed Feb. 17, 1967
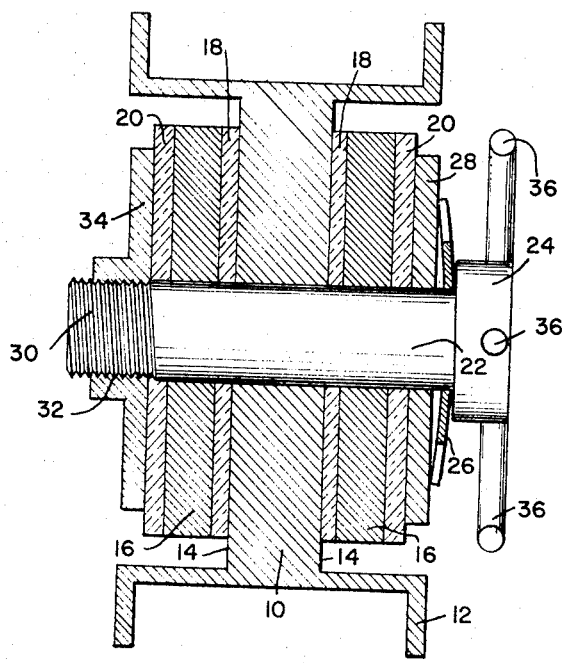
INVENTOR.
DAVID BOGUE
BY
ATTORNEY 3,434,676
FISHING REEL BRAKE
David Bogue, c/o Speedway Manufacturing and Equipment
Co., R.R. 1, Box 112, Jupiter, Fla. 33458
Filed Feb. 17, 1967, Ser. No. 616,833
Int. Cl. A01k 89/02; F16d 69/00, 11/00
U.S. Cl. 242—84.5                                         3 Claims

ABSTRACT OF THE DISCLOSURE

A brake having relatively rotatably movable members having radial surfaces movable into and out of abutment, one of the surfaces being silicone rubber. Since silicone rubber has a dynamic coefficient of friction greater than its static coefficient of friction, the brake is eminently suited for use where the loading is comparable with those to which fishing reels are subjected.

---

This invention relates to a brake, particularly a disk brake wherein the dynamic coefficient of friction between the relatively movable parts is greater than the static coefficient of friction.

Whereas the invention is applicable to brakes employed in many environments, it is particularly applicable to fishing reels. In a fishing reel, the brake provides an adjustable means of resisting the pull of a fish on the line, and such brakes are adjustable to take advantage of the maximum strength of the line without exceeding its limit.

It has been common to provide means for varying the axial pressure on the brake disks of a fishing reel, which frequently include a stationary disk or surface and a rotatable member carrying a reel, between which a friction disk or washer is sandwiched to provide the desired braking characteristics. Washers of various materials have been used for this purpose in conventional fishing reel brakes, but until now, all of the materials employed have produced a static coefficient of friction considerably higher than the dynamic coefficient of friction, with the result, that the braking action is erratic and might be characterized as "jerky." In connection with such known materials, as soon as slippage is initiated between the relatively movable parts of the brake, the resistance decreases, rendering it impossible to utilize the maximum strength of the line while the parts are in motion, since the greater static coefficient of friction will determine the stress under which the line will break.

In accordance with the present invention, extremely smooth braking action is achieved by providing a brake comprising relatively rotatably movable members having adjacent surfaces, means for relatively moving said adjacent surfaces of said members to and from abutting relationship, one of the surfaces being formed of a material having a dynamic coefficient of friction greater than its static coefficient of friction, such material being preferably silicone rubber. In accordance with a preferred embodiment of the invention, one of the members is rotatably driven, the surface of the other member is silicone rubber, and the adjacent surfaces are radial.

It is contemplated that the driven member be interposed between a pair of members having radial surfaces formed of material whose dynamic coefficient of friction exceeds its static coefficient of friction adjacent to the radial surfaces of the driven member and that force applying elements are relatively movable for moving the members to and from abutting relationship. It is also contemplated that the driven member be connected with a reel, so that where the brake is incorporated in a fishing reel, the line will impart movement to the reel and driven member.

A more complete understanding of the invention will follow from a description of the drawing wherein the single figure depicts in a somewhat diagrammatic fashion a cross-sectional view of the brake of the present invention applied to a fishing reel.

A relatively rotatable member 10 carrying a reel 12 has opposed surfaces 14 sandwiched between a pair of disks 16 whose surfaces 18 proximate to the member 10 are formed of a material having a dynamic coefficient of friction greater than its static coefficient of friction, a property which characterizes silicone rubber.

The surfaces of the disk 16 remote from the member 10 may also be formed of a material having a dynamic coefficient of friction greater than its static coefficient of friction and such surfaces have been denoted 20. This arrangement will permit the reversal of the disks 16 to bring the surfaces 20 into engagement with the member 10 in the event of undue damage or wear to the surface 18.

The members 10 and 16 are assembled on a shaft 22 having a head 24 engaging a spring washer 26 which is in turn in engagement with a clamping disk or element 28 bearing against the right hand disk 16. The opposite end of the shaft 22 is shown as having a thread 30 engaging complementary threads 32 formed in the internal bore of a clamping disk or element 34. By adjustment of the shaft 22 manually, to advance or retract the threads 30 from the clamping member 34, adjustment of the brake can be effected. Rotation of the shaft 22 is facilitated by means of studs or spokes 36 extending radially from the head 24.

In the form of the invention depicted in the drawing, it will be evident that rotation of the member 10 will tend to impart rotation to the members 16, to a degree determined by the positions of the elements 28 and 34 under the influence of the shaft 22. Since both radial surfaces of the elements 28 and 34 are formed of silicone rubber, the frictional characteristics between the elements 28 and 34 and the surfaces 20 will be the same as those between the member 10 and the surfaces 16.

By virtue of the friction characteristics already discussed in conjunction with silicone rubber, there is less resistance to rotation between the parts at the beginning of relative movement than there is during relative movement, assuring an extremely smooth braking action, reducing the danger of breakage of a line wound on the reel, and very little effect discernible from the presence or obsence of lubricating oil. The element of wear between the relatively movable parts is far more favorable in connection with the present invention than it has been in prior art disclosures of brakes of the type under consideration.

I claim:
1. A fishing reel brake including:
a rotatable reel having an engaging surface thereon;
brake means having a braking surface thereon, said breaking surface and said engaging surface being adjacent and one of said surfaces being formed of material having a dynamic coefficient of friction greater than its static coefficient of friction; and actuating means for moving one of said surfaces to engagement with the other surface during rotation of said reel to impose a smooth braking force acting on said reel commensurate with the frictional characteristics of said material material.
2. A fishing reel brake as in claim 1 wherein:
said material is silicone rubber.
3. A fishing reel brake as in claim 1 wherein:
said reel has a pair of opposed engaging surfaces;
said brake means includes a pair of braking surfaces positioned adjacent to said engaging surfaces of said reel, eachof said braking surfaces being of silicone rubber and having a dynamic coefficient of friction greater than to static coefficient of friction; and wherein said actuating means includes means for moving said braking surfaces into engagement with said engaging surfaces of said reel.

References Cited

UNITED STATES PATENTS

| 2,745,607 | 5/1956 | Taggart et al. | |
|---|---|---|---|
| 2,857,030 | 10/1958 | Samo. | |
| 2,960,280 | 11/1960 | Connelly et al. | |
| 3,003,609 | 10/1961 | Lang. | |
| 3,134,462 | 5/1964 | Messinger | 188—129 |

GEORGE E. A. HALVOSA, *Primary Examiner.*

U.S. Cl. X.R.

188—250; 192—107